United States Patent
DiPoala (10) Patent No.: US 10,160,422 B2
(45) Date of Patent: Dec. 25, 2018

(54) METHOD FOR RESPONDING TO MOVEMENT IN AND AROUND A LOCKED VEHICLE

(71) Applicant: Robert Bosch GmbH, Stuttgart (DE)

(72) Inventor: William DiPoala, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/678,466

(22) Filed: Aug. 16, 2017

(65) Prior Publication Data

US 2018/0050665 A1 Feb. 22, 2018

Related U.S. Application Data

(60) Provisional application No. 62/376,787, filed on Aug. 18, 2016.

(51) Int. Cl.
*B60R 25/10* (2013.01)
*B60R 25/31* (2013.01)

(52) U.S. Cl.
CPC .......... *B60R 25/31* (2013.01); *B60R 25/1004* (2013.01)

(58) Field of Classification Search
CPC ....... B60R 25/31; B60R 25/1004; E05F 15/73
USPC .. 340/426.26, 430, 539.22, 541, 545.2, 551, 340/552, 561, 565
See application file for complete search history.

(56) References Cited

U.S. PATENT DOCUMENTS

| | | | |
|---|---|---|---|
| 5,117,217 A * | 5/1992 | Nykerk | B60R 25/04 307/10.2 |
| 5,351,054 A | 9/1994 | Fredericks et al. | |
| 5,966,090 A * | 10/1999 | McEwan | A61B 5/0507 340/541 |
| 6,420,995 B1 | 7/2002 | Richmond et al. | |
| 6,535,161 B1 | 3/2003 | McEwan | |
| 6,697,011 B2 | 2/2004 | Yabugaki | |
| 7,123,145 B2 * | 10/2006 | Reilly | G01S 13/56 340/552 |
| 7,952,515 B2 | 5/2011 | McEwan | |
| 2015/0160067 A1 | 6/2015 | Sai | |

FOREIGN PATENT DOCUMENTS

EP 2045621 4/2009

* cited by examiner

*Primary Examiner* — Toan N Pham
(74) *Attorney, Agent, or Firm* — Michael Best & Friedrich LLP (57) ABSTRACT

A device for responding to movement in or around a vehicle. In one example, the device comprises a radio frequency (RF) transmission circuit, a radio frequency (RF) transmission circuit, and a controller that is electrically coupled to the RF transmission circuit and RF reception circuit. The controller times the generation of control signals to create detection envelopes. The controller also determines motion within the detection envelopes, and generates an output based on the detection envelope that motion was determined within.

21 Claims, 6 Drawing Sheets

METHOD FOR RESPONDING TO MOVEMENT IN AND AROUND A LOCKED VEHICLE

FIELD

Embodiments relate to motion detectors.

BACKGROUND

Modern surveillance systems incorporate various types of sensors for detecting persons within an area under surveillance. In some instances, the surveillance systems include a motion detector that uses radio frequency (RF) waves to sense motion of objects within the area under surveillance. In such cases, the motion detector transmits an RF wave and receives a reflected RF wave from the object. Based on when the reflected waves are received, a distance between the object and the motion detector can be determined. The motion detector may monitor the distance between the object and the motion detector over time and trigger a notification or an alarm when motion is detected. In this way, the motion detector may detect the presence of a person, for example an intruder, in the area under surveillance.

However, in some cases, the motion detector may detect motion from other objects besides people. For example, the motion detector may detect motion of insects, rodents, birds, and the like. As a consequence, false alarms may be triggered by the motion detector. In addition, false alarms may be triggered by people, who are not intruders, walking past the locked vehicle or the owner of the locked vehicle walking too close to the locked vehicle before unlocking it.

SUMMARY

Embodiments provide, among other things, a device and a method for responding to movement in or around a vehicle. The device is comprised of a radio frequency (RF) transmission circuit, an RF reception circuit, and a controller. The controller is electrically coupled to the RF transmission circuit and the RF reception circuit. The controller times the generation of control signals to create detection envelopes. The controller detects motion within the detection envelopes. The controller generates an output based on the detection envelope that motion was detected within.

Another embodiment provides a method for responding to movement in or around a vehicle. The method incudes timing, with a controller, the generation of control signals in order to create a detection envelope. The method uses the controller to determine, based on the received RF signal, the detection envelope that motion was detected within. An output is generated based on the detection envelope that motion was detected within.

Another embodiment provides a motion detector including a radio frequency (RF) transmission circuit, an RF reception circuit, and a controller that is electrically coupled to the RF transmission circuit and the RF reception circuit. The controller is configured to control the RF transmission circuit to generate an RF signal and control the RF reception circuit to receive a reflected RF signal from a first object in a first predetermined time for reception after transmission of the RF signal. The controller is further configured to control the RF reception circuit to generate a Doppler signal indicative of a distance between the first object and the motion detector based on the reflected RF signal. The controller is further configured to activate an alarm indicator based on a magnitude of the Doppler signal indicative of a distance between the first object and the motion detector.

The controller is also configured to control the RF transmission circuit to generate an RF signal and control the RF reception circuit to receive a reflected RF signal from a second object in a second predetermined time for reception after transmission of the RF signal. The controller is further configured to control the RF reception circuit to generate a Doppler signal indicative of a distance between the second object and the motion detector based on the reflected RF signal. The controller is further configured to activate a pre-alarm indicator based on a magnitude of the Doppler signal indicative of a distance between the second object and the motion detector.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1A:
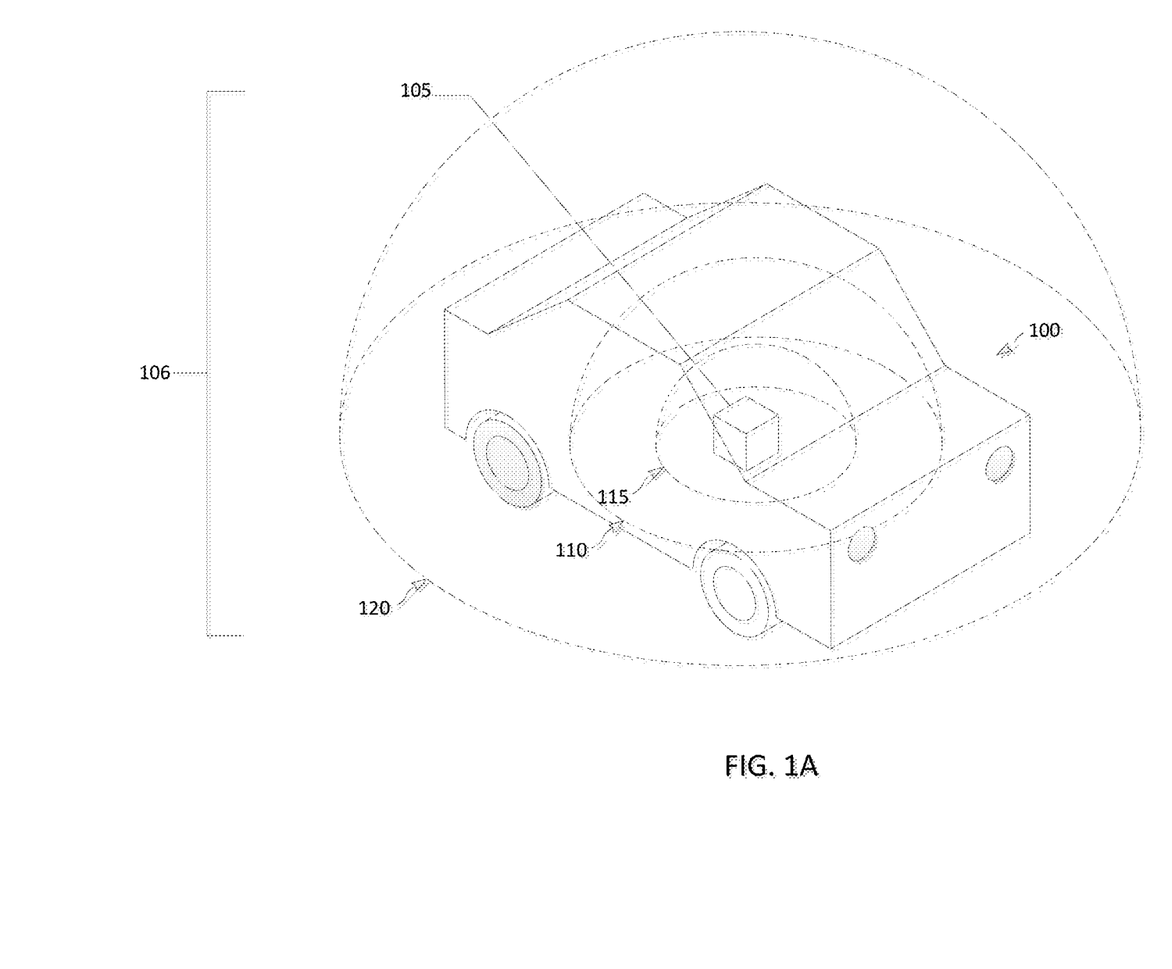
FIG. 1A is a representation of a vehicle equipped with a motion detector.
Figure 1B:
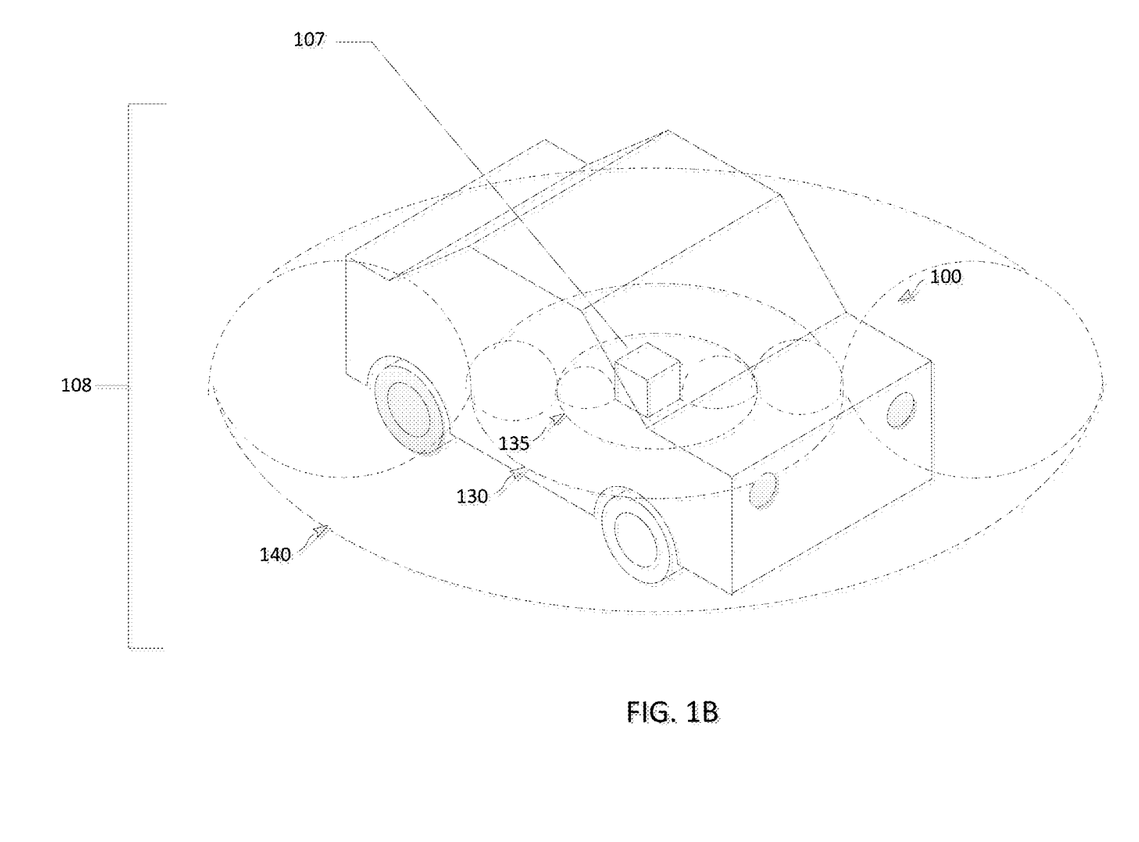
FIG. 1B is a representation of a vehicle equipped with a motion detector.

FIG. 1A and FIG. 1B illustrate a vehicle 100. In these illustrations, it is assumed that doors and windows of the vehicle are locked. As will be explained in greater detail, a motion detector 105 includes a radio-frequency signal generator that generates radio waves in a manner that results in the creation of detection shells or envelopes 106. A motion detector 107 includes a radio-frequency signal generator that generates radio waves in a manner that results in the creation of detection shells or envelopes 108. There is a plurality of possible shapes for a detection envelope. FIG. 1A depicts the detection envelopes 106 as being hemispherical. FIG. 1B depicts the detection envelopes 108 (described in greater detail below) as being toroidal. In the remainder of the description, the term "detection envelopes" may be used. Unless the text indicates otherwise, when the term "envelope" is used, no particular shape is intended.

The detection envelopes 106 depicted in FIG. 1A include an inner detection hemisphere 110 that defines an area in which the motion detector 105 detects moving objects. The motion detector also generates a non-detection hemisphere 115 having a hemisphere with a small radius (for example, a one foot radius or less) from a point of the motion detector 105 and within which the motion detector 105 does not detect objects. The motion detector 105 does not detect objects in this area so that small objects, such as bugs, do not generate an alarm indicator (an example of which is discussed below). In one example, the inner radius of the inner detection hemisphere 110 is one foot from the motion detector 105 and the outer radius is four feet from the motion detector 105. The area covered by the inner detection hemisphere 110 is limited to the interior of the vehicle 100. If the motion detector 105 detects an object in this area, the motion detector 105 may generate an alarm indicator, such as activating a horn or siren (not shown) of the vehicle 100. The motion detector 105 may generate other outputs upon detecting an object with in the inner detection hemisphere 110. For example, the motion detector 105 may communicate to the vehicle's information system that a message should be sent to a mobile device, belonging to the vehicle's owner.

In the illustrated example, the motion detector 105 also generates an outer detection hemisphere 120, which is a hemispherical shell. The inner radius of the outer detection hemisphere 120 is four feet from the motion detector 105 and the outer radius is six feet from the motion detector 105. The area covered by the outer detection hemisphere 120 extends outside of the vehicle 100 because the RF waves are able to pass through the windows of the vehicle without being reflected back to the motion detector 105. The RF waves are reflected back to the motion detector 105 from other parts of the vehicle's body. For this reason, the only motion that can be detected outside of the vehicle 100 is motion that is detected by the RF waves that pass through the windows. When an object is detected in the outer detection hemisphere 120 by the motion detector 105, the motion detector 105 generates a first pre-alarm indicator (an example of which is discussed below). For example, the motion detector 105 will send a signal that the vehicle's internal lights should be turned on. If the motion detector 105 detects motion in the outer detection hemisphere 120 for a predetermined time interval, such as five or ten seconds, the motion detector 105 will generate a second pre-alarm indicator. For example, the motion detector 105 will send a signal to the vehicle's alarm system requesting the alarm system to sound a short beep or chirp.

The conditions for activating the vehicle's alarm indicator, first pre-alarm indicator and second pre-alarm indicator may differ depending on the type of vehicle the motion detector 105 is placed in. For example, if the vehicle 100 is a convertible the motion detector 105 may have a predetermined time interval, for which the object must be detected in the inner detection hemisphere 110 before the vehicle's alarm indicator can be activated. This condition prevents the motion detector 105 from generating a false alarm in situations such as, a person walking by the convertible with their arms extended when the convertible's top is down.

The detection envelopes 108 depicted in FIG. 1B include an inner detection toroid 130 that defines an area in which the motion detector 107 detects moving objects. The motion detector 107 also generates a non-detection toroid 135 having a small outer radius (for example, a one foot radius or less) from a point of the motion detector 107 and within which the motion detector 107 does not detect objects. The motion detector 107 does not detect objects in this area so that small objects, such as bugs, do not generate an alarm indicator (an example of which is discussed below). In one example, the inner radius of the inner detection toroid 130 is one foot from the motion detector 107 and the outer radius is four feet from the motion detector 107. The area covered by the inner detection toroid 130 is limited to the interior of the vehicle 100. If the motion detector 107 detects an object in this area, the motion detector 107 may generate an alarm indicator, such as activating a horn or siren (not shown) of the vehicle 100. The motion detector 107 may generate other outputs upon detecting an object with in the inner detection toroid 130. For example, the motion detector 107 may communicate to the vehicle's information system that a message should be sent to a mobile device, belonging to the vehicle's owner.

In the illustrated example, the motion detector 107 also generates an outer detection toroid 140. The inner radius of the outer detection toroid 140 is four feet from the motion detector 107 and the outer radius is six feet from the motion detector 107. The area covered by the outer detection toroid 140 extends outside of the vehicle 100 because the RF waves are able to pass through the windows of the vehicle 100 without being reflected back to the motion detector 107. The RF waves are reflected back to the motion detector 107 from other parts of the vehicle's body. For this reason, the only motion that can be detected outside of the vehicle 100 is motion that is detected by the RF waves that pass through the windows. When an object is detected in the outer detection toroid 140 by the motion detector 107, the motion detector 107 generates a first pre-alarm indicator. For example, the motion detector 107 will send a signal that the vehicle's internal lights should be turned on. If the motion detector 107 detects motion in the outer detection toroid 140 for a predetermined time interval, such as five or ten seconds, the motion detector 107 will generate a second pre-alarm indicator. For example, the motion detector 107 will send a signal to the vehicle's alarm system requesting the alarm system to sound a short beep or chirp.

The conditions for activating the vehicle's alarm indicator, first pre-alarm indicator, and second pre-alarm indicator may differ depending on the type of vehicle the motion detector 107 is placed in. For example, if the vehicle 100 is a convertible the motion detector 107 may have a predetermined time interval, for which the object must be detected in the inner detection toroid 130 before the vehicle's alarm indicator can be activated. This condition prevents the motion detector 107 from generating a false alarm in situations such as, a person walking by the convertible with their arms extended when the convertible's top is down.

Figure 2:
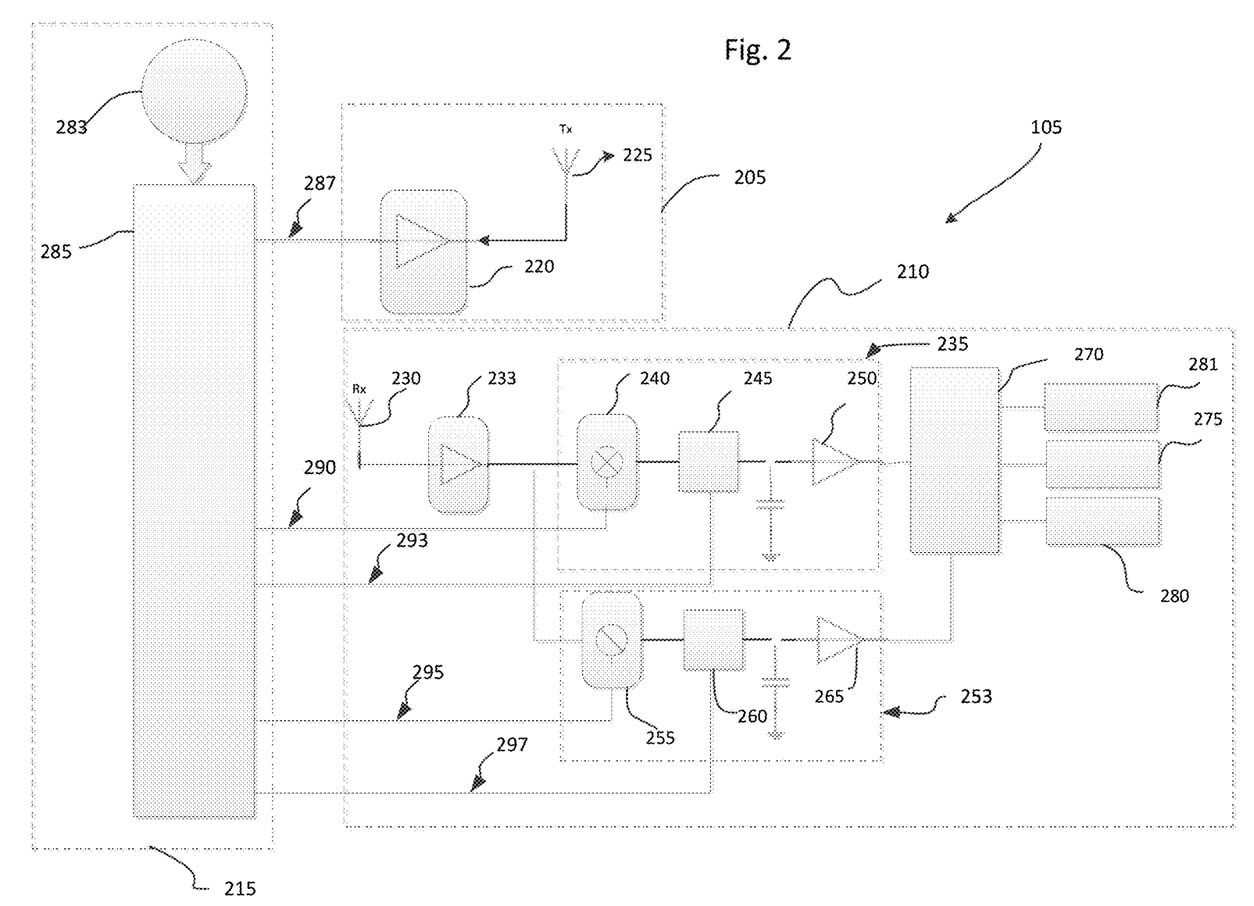
FIG. 2 is an electrical schematic of a motion detector with multiple path processing.

FIG. 2 illustrates the motion detector 105 (a device) with multiple path processing according to one embodiment. In the example illustrated, the motion detector 105 includes a radio frequency (RF) transmission circuit 205, a RF reception circuit 210, and a controller 215. The RF transmission circuit 205 includes a RF shape generator 220 (for example, a RF burst generator) and a transmission antenna 225. The RF reception circuit 210 is configured to receive a reflected RF signal. The RF reception circuit 210 includes a reception antenna 230 and a low-noise amplifier 233. The RF reception circuit 210 also includes two parallel paths that branch from the low-noise amplifier 233. A first path 235 contains a mixer 240, a sample and hold circuit 245, and an op-amp 250. A second path 253 also contains a mixer 255, a sample and hold circuit 260, and an op-amp 265. Both paths connect to a controller 270. The controller 270 is included in the RF reception circuit 210. Based on input received by the controller 270, the controller 270 generates an alarm indicator 275, first pre-alarm indicator 280, or second pre-alarm indicator 281. FIG. 2 provides one example of the motion detector 105 with multiple path processing. However, configurations and constructions that generate detection hemispheres such as those illustrated in FIG. 1 other than those illustrated and described herein are possible.

In the example illustrated, an output of the controller 215 is electrically coupled to the RF shape generator 220, and the RF shape generator 220 is electrically coupled to the transmission antenna 225. Other outputs of the controller 215 are electrically coupled to the mixer 240, the mixer 255, the sample and hold circuit 245, and the sample and hold circuit 260. The reception antenna 230 is electrically coupled to an input of the low-noise amplifier 233 and an output of the low-noise amplifier 233 is electrically coupled to the mixer 240 and the mixer 255. An output of the mixer 240 is electrically coupled to an input of the sample and hold circuit 245. An output of the sample and hold circuit 245 is electrically coupled to the op-amp 250. An output of the op-amp 250 is electrically coupled to the controller 270. An output of the mixer 255 is electrically coupled to an input of the sample and hold circuit 260. An output of the sample and hold circuit 260 is electrically coupled to the op-amp 265. An output of the op-amp 265 is electrically coupled to the controller 270. Outputs of the controller 270 are electrically coupled to the alarm indicator 275, first pre-alarm indicator 280, and second pre-alarm indicator 281.

Figure 3:
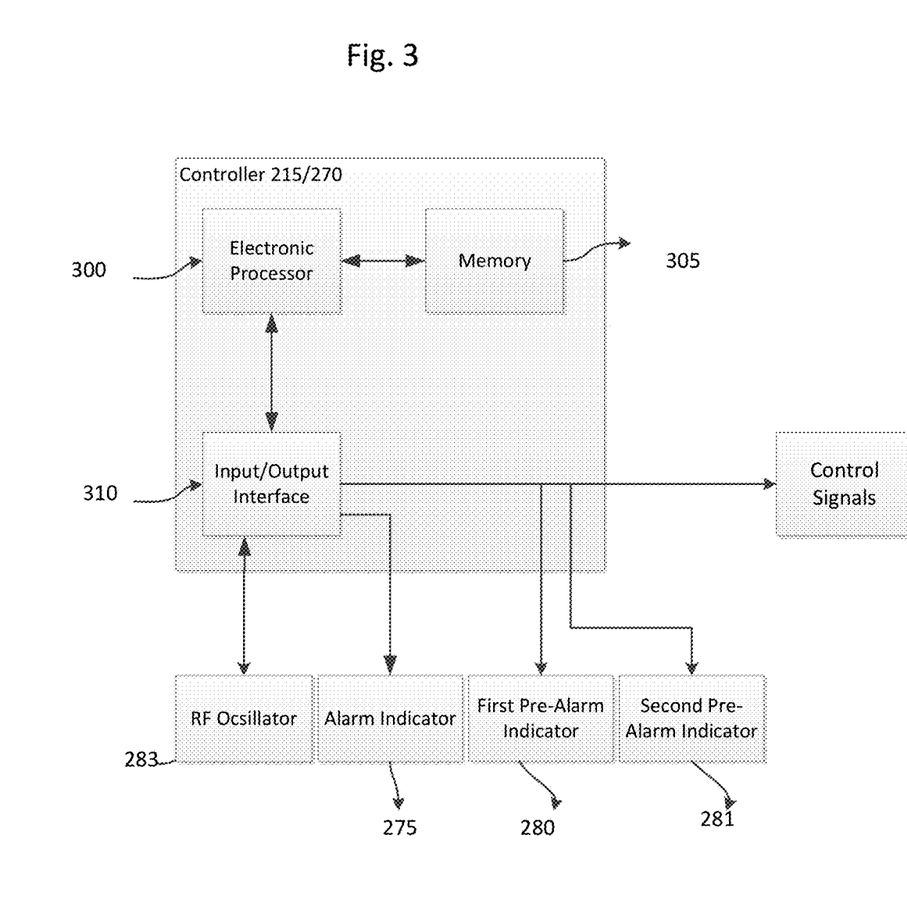
FIG. 3 is a diagram of a controller of the motion detector of FIG. 2.

In some embodiments, the controller 215 includes an RF oscillator 283 and a time gate and pulse generator circuit 285. A combination of these components provides the controller 215 with the ability to generate the control signals illustrated in FIG. 4. The control signals include a control signal 287, a control signal 290, a control signal 293, a control signal 295, and a control signal 297. In some embodiments, the controller 215 generates the control signals using a combination of various hardware and software components. In one example, the controller 215 is implemented by a microcontroller as illustrated in FIG. 3 and described below. Similarly, the controller 270 may be implemented with a combination of hardware components. In one example, the controller 270 is implemented in the same hardware configuration as the controller 215. In other embodiments, the controller 270 is implemented with a particular hardware profile depending on the needs of the particular application. In one example, the motion detector 105 may have a single antenna for transmitting and receiving RF signals. In this embodiment, the RF transmission circuit 205 and the RF reception circuit 210 may be incorporated into a transceiver for transmission and reception while still using the concepts described herein.

FIG. 3 illustrates the components of the controller 215 and the controller 270 (hereafter labelled as controllers 215, 270) according to one embodiment. In the example illustrated, the controllers 215, 270 include a plurality of electrical and electronic components that provide power, operation control, and protection to the components and modules within the controllers 215, 270. The controllers 215, 270 include, among other things, an electronic processor 300 (such as a programmable electronic microprocessor, microcontroller, or similar device), a memory 305 (for example, non-transitory, machine readable memory), and an input/output interface 310. The controllers 215, 270 may include additional electronic processors or memory. The controllers 215, 270 may include, in addition to or in lieu of the electronic processor 300, application specific integrated circuits (ASICs), field programmable gate arrays (FPGAs), or both. The controllers 215, 270 are configured to implement, among other things, the processes and methods described herein. In other embodiments, the controllers 215, 270 include additional, fewer, or different components.

The electronic processor 300 is communicatively coupled to the memory 305 and executes instructions which are capable of being stored on the memory 305. The electronic processor 300 is configured to retrieve from memory 305 and execute instructions related to the methods of operation of the motion detector 105. The electronic processor 300 is communicatively coupled to the input/output interface 310. The input/output interface 310 is communicatively coupled to hardware external to the controllers 215, 270. For example, the input/output interface 310 is communicatively coupled to the alarm indicator 275, the first pre-alarm indicator 280, the second pre-alarm indicator 281, and the RF oscillator 283. In some embodiments, the input/output interface 310 may generate the control signals 287, 290, 293, 295, 297. In some embodiments, the input/output interface 310 directly or indirectly activates an indication of motion by means of a central security system, a messaging system, a security network, a local alarm (for example, an alarm light or siren) and the like.

Figure 4:
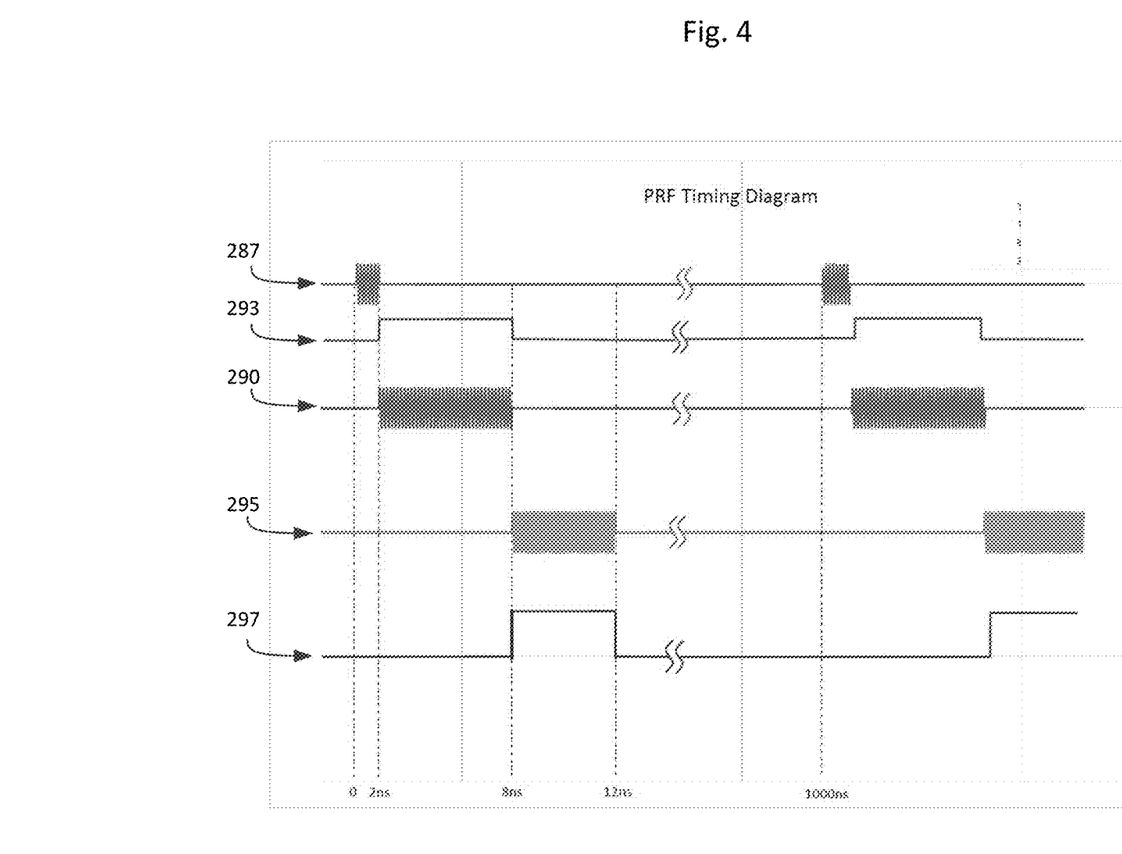
FIG. 4 is a diagram of a timing sequence for operational control of the motion detector of FIG. 2 that is initiated by the controller of FIG. 3.

FIG. 4 illustrates a diagram of a timing sequence for the control signals 287, 290, 293, 295, 297 as generated by the controller 215 according to one embodiment. In the example shown, a single transmission and reception cycle occurs in a 12 nanosecond time interval. The transmission and reception cycle may occur every 1000 nanoseconds. The control signal 287 is sent from the controller 215 to the RF shape generator 220. Based on the control signal 287, the RF shape generator 220 generates an RF burst according to a frequency and a time period of activation based on the control signal 287. It takes approximately 2 nanoseconds for the transmitted RF wave to be reflected back to the RF reception circuit 210 for each foot of detection range. The control signal 287 creates the non-detection hemisphere 115 because it starts at a time of zero nanoseconds and ends at a time of two nanoseconds. The control signal 290 and the control signal 293 create the inner detection hemisphere 110 because they start at the time of two nanoseconds and end at a time of eight nanoseconds. The control signal 295 and the control signal 297 create the outer detection hemisphere 120 because they start at the time of eight nanoseconds and end at a time of twelve nanoseconds. The timing sequences and control signals 287, 290, 293, 295, 297 illustrated in FIG. 4 will be referenced in discussion of the method below.

Figure 5:
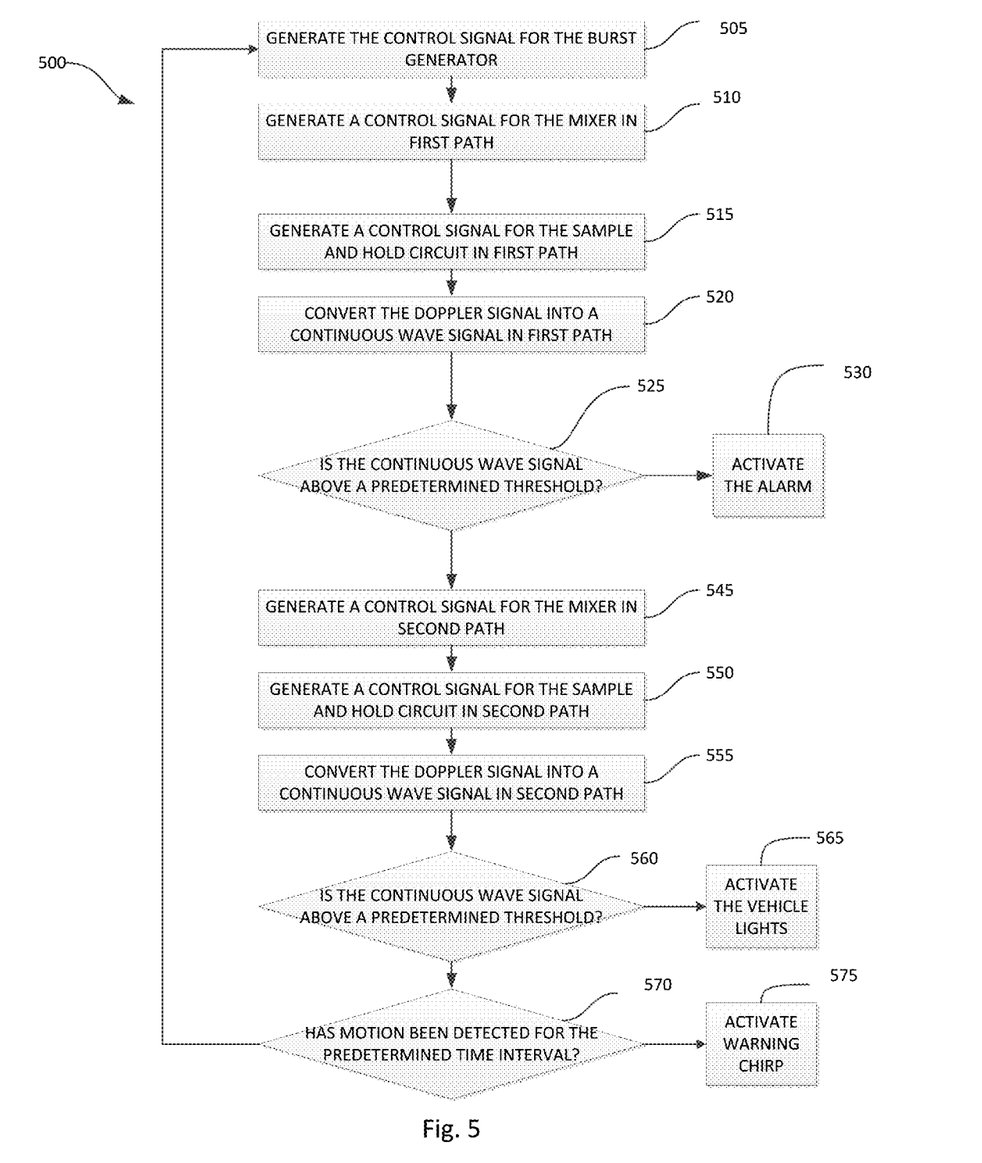
FIG. 5 is a flow chart of a method for operating the motion detector of FIG. 2.

FIG. 5 illustrates a method 500 of operating the motion detector 105 to determine movement in and around the vehicle 100 and responding to the detected movement according to one embodiment. In the embodiment illustrated, the controller 215 generates the control signal 287 (block 505). The control signal 287 is sent from the controller 215 to the RF shape generator 220. After transmitting the RF waves, the controller 215 generates and outputs the control signal 290 to the mixer 240 (block 510). The control signal 290 is activated a predetermined amount of time, for example, 2 nanoseconds, after the control signal 287 is activated. The delay between control signal 287 being activated and control signal 290 being activated causes the motion detector 105 to ignore reflections caused by objects with in a predetermined range, for example one foot, of the motion detector 105.

The mixer 240 provides a Doppler signal indicative of the distance from an object to the motion detector 105 and based on a combination of the control signal 290 and the received RF signal. For example, the Doppler signal may represent a difference between the control signal 290 and the received RF signal. The Doppler signal may have a low frequency (for example, 0.1 to 100 Hertz). The control signal 290 sets a detection range for the inner detection hemisphere 110. The control signal 290 is active for 6 nanoseconds. Since it takes approximately 2 nanoseconds for the transmitted RF wave to be reflected back to the RF reception circuit 210 for each foot of detection range, a 6 nanosecond control signal limits the detection range to 3 feet. The control signal 290 begins at a time of 2 nanoseconds and ends at a time of 8 nanoseconds to provide a detection range, for the motion detector 105, of one foot to four feet from the motion detector 105. As a consequence, the mixer 240 does not provide a Doppler signal based on the reflected RF waves received after 8 nanoseconds due to the lack of the control signal 290 after 8 nanoseconds.

The controller 215 also generates a control signal 293 and sends the control signal 293 to the sample and hold circuit 245 (block 515). As illustrated, the control signal 293 may be a 6 nanosecond pulse to activate the sample and hold circuit 245 during reception of the reflected signal. Since the transmitted RF wave may be transmitted as a burst, the sample and hold circuit 245 converts the Doppler signal, which also may be received as a burst, into a continuous wave signal (block 520). In some embodiments, a signal from the output of the sample and hold circuit 245 is amplified by the op-amp 250 before being sent to the controller 270. The controller 270 compares the magnitude of the continuous wave signal to a predetermined threshold (block 525) ("a first predetermined threshold") and activates the alarm indicator 275 (block 530) when the continuous wave signal is above the predetermined threshold.

The controller 215 also generates the control signal 295 to the mixer 255 (block 545). The control signal 295 is activated a predetermined amount of time, for example 8 nanoseconds, after the control signal 287 is activated. The mixer 255 provides a Doppler signal indicative of the distance from an object to the motion detector 105 and based on a combination of the control signal 295 and the received RF signal. For example, the Doppler signal may represent a difference between the control signal 295 and the received RF signal. The Doppler signal may have a low frequency (for example, 0.1 to 100 Hertz). The control signal 295 sets a detection range for the outer detection hemisphere 120. In one example, the control signal 295 is active for 4 nanoseconds. Since it takes approximately 2 nanoseconds for the transmitted RF wave to be reflected back to the RF reception circuit 210 for each foot of detection range, a 4 nanosecond control signal limits the detection range to 2 feet. The control signal 295 begins at a time of 8 nanoseconds and ends at a time of 12 nanoseconds to provide a detection range, for the motion detector 105, of four feet to six feet from the motion detector 105. As a consequence, the mixer 255 does not provide a Doppler signal based on the reflected RF waves received after 12 nanoseconds due to the lack of the control signal 295 after 12 nanoseconds.

The controller 215 also generates a control signal 297 and sends the control signal 297 to the sample and hold circuit 260 (block 550). As discussed, the control signal 297 may be a 4 nanosecond pulse to activate the sample and hold circuit 260 during reception of the reflected signal. Since the transmitted RF wave may be transmitted as a burst, the sample and hold circuit 260 converts the Doppler signal, which also may be received as a burst, into a continuous wave signal (block 555). In some embodiments, a signal from the output of the sample and hold circuit 260 is amplified by the op-amp 265 before being sent to the controller 270. The controller 270 compares the magnitude of the continuous wave signal to a predetermined threshold (block 560) ("a second predetermined threshold") and activates the first pre-alarm indicator 280 (block 565) when the continuous wave signal is above the predetermined threshold.

The controller 270 tracks the time interval in which the continuous wave signal is above the predetermined threshold. The controller 270 compares the time interval in which the continuous wave signal is above the predetermined threshold to a predetermined time interval (block 570). If the time period that the continuous wave signal is above the predetermined threshold is greater than or equal to the predetermined time interval the motion detector 105 activates the second pre-alarm indicator 281 (block 575).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A device for responding to movement in or around a vehicle, the device comprising:
   a radio frequency (RF) transmission circuit;
   an RF reception circuit;
   a controller that is electrically coupled to the RF transmission circuit and the RF reception circuit, the controller configured to
      time a generation of control signals to create a detection envelope;
      detect motion within the detection envelope, the detection envelope including an inner detection envelope and an outer detection envelope;
      generate an alarm indicator when motion is detected within the inner detection envelope; and
      generate a pre-alarm indicator when motion is detected within the outer detection envelope.

2. The device according to claim 1, wherein the controller is configured to track a time interval that motion has been detected within the outer detection envelope.

3. The device according to claim 2, wherein the controller compares the time interval that motion has been detected within the outer detection envelope to a predetermined time interval.

4. The device according to claim 3, wherein the controller is configured to generate a second pre-alarm indicator when the time interval that motion has been detected within the outer detection envelope exceeds the predetermined time interval.

5. The device according to claim 4, wherein the controller generates the second pre-alarm indicator by sending a signal to an alarm system of the vehicle requesting the alarm system to sound a beep or chirp.

6. The device according to claim 1, wherein the detection envelope also includes a non-detection envelope having a one foot radius from the device, wherein no motion is detected within the non-detection envelope.

7. The device according to claim 1, wherein the RF reception circuit has multiple path processing including a first path and a second path, wherein the first path detects motion in the inner detection envelope and the second path detects motion in the outer detection envelope.

8. The device of claim 1, wherein the pre-alarm indicator includes turning on an interior light of the vehicle.

9. The device of claim 1, wherein the alarm indicator includes sounding a horn or siren belonging to the vehicle.

10. The device of claim 1 wherein, the detection envelope is one of a plurality of possible shapes, including a hemisphere and a toroid.

11. A method for responding to movement in or around a vehicle, the method comprising:
   timing, with a controller, the generation of control signals to create a detection envelope;
   detecting, with the controller and based on a received RF signal, motion within the detection envelope, the detection envelope including an inner detection envelope and an outer detection envelope;
   generating, with the controller, an alarm indicator when motion is detected within the inner detection envelope; and
   generating, with the controller, a pre-alarm indicator when motion is detected within the outer detection envelope.

12. The method according to claim 11, wherein a time interval that motion has been detected within the outer detection envelope is tracked with the controller.

13. The method according to claim 12, wherein the controller compares the time interval that motion has been detected within the outer detection envelope to a predetermined time interval.

14. The method according to claim 11, wherein no motion within a one foot radius of a motion detector is determined by the controller.

15. The method of claim 11, wherein generating the pre-alarm indicator includes turning on an interior light of the vehicle.

16. The method of claim 11, wherein generating the alarm indicator includes sounding a horn or siren belonging to the vehicle.

17. The method of claim 11 wherein, the detection envelope is one of a plurality of possible shapes, including a hemisphere and a toroid.

18. A motion detector comprising:
   a radio frequency (RF) transmission circuit;
   an RF reception circuit;
   a controller that is electrically coupled to the RF transmission circuit and the RF reception circuit, the controller configured to
      control the RF transmission circuit to generate an RF signal, control the RF reception circuit to receive a reflected RF signal from a first object in a first predetermined time for reception after transmission of the RF signal;
      control the RF reception circuit to generate a Doppler signal indicative of a distance between the first object and the motion detector based on the reflected RF signal;
      activate an alarm indicator based, at least in part, on a magnitude of the Doppler signal indicative of the distance between the first object and the motion detector;
      control the RF reception circuit to receive a reflected RF signal from a second object in a second predetermined time for reception after transmission of the RF signal;
      control the RF reception circuit to generate a Doppler signal indicative of a distance between the second object and the motion detector based on the reflected RF signal;
      activate a pre-alarm indicator based, at least in part, on a magnitude of the Doppler signal indicative of the distance between the second object and the motion detector.

19. The controller of the motion detector of claim 18, the controller further configured to track a time interval that the magnitude of the Doppler signal indicative of the distance between the second object and the motion detector is greater than a second predetermined threshold.

20. The controller of the motion detector of claim 18, the controller configured to activate the alarm indicator when the magnitude of the Doppler signal indicative of the distance between the first object and the motion detector is greater than a first predetermined threshold.

21. The controller of the motion detector of claim 18, the controller configured to activate the pre-alarm indicator when the magnitude of the Doppler signal indicative of the distance between the second object and the motion detector is greater than a second predetermined threshold.

* * * * *